Patented Oct. 8, 1935

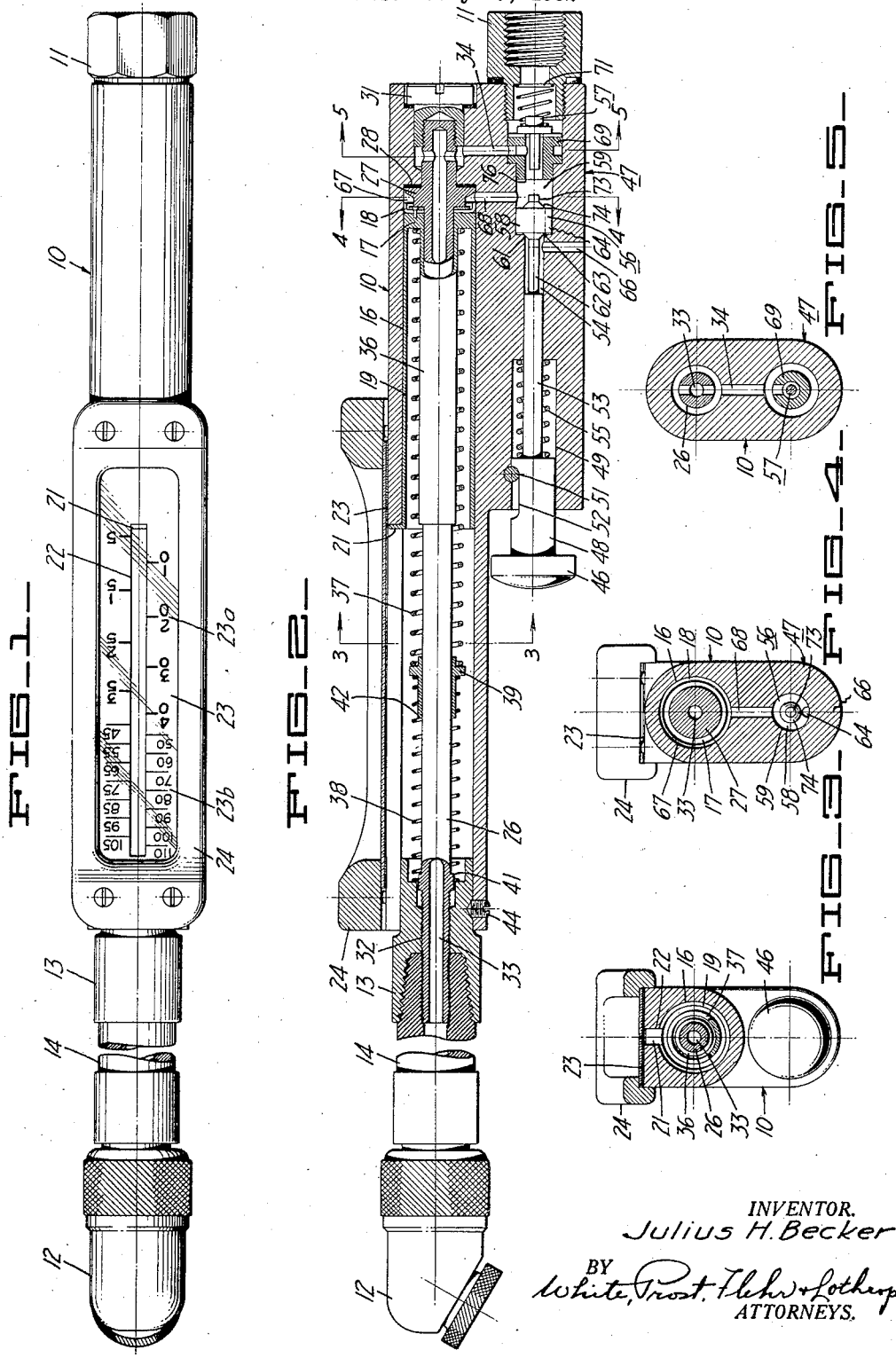

2,016,586

UNITED STATES PATENT OFFICE 2,016,586

PNEUMATIC PRESSURE GAUGE

Julius H. Becker, San Francisco, Calif., assignor to The Decora Manufacturing Company, Inc., Richmond, Calif., a corporation of Nevada Application July 19, 1932, Serial No. 623,362

3 Claims. (Cl. 73—111)

This invention relates generally to pressure gauges utilized in the inflation of pneumatic tires. More particularly it relates to devices of this character which are attached to the end of an air hose, for ready application to the valve stem of an automobile tire.

It is a general object of the invention to devise an improved form of pressure gauge of the above character, which will give comparatively accurate pressure readings when employed in connection with both high and low pressure automobile and truck tires.

It is a further object of the invention, to provide in a pressure gauge of the above character, means whereby ready adjustments can be made to afford accuracy, both at the time of assembling the parts in manufacture, and after the gauge has been in use.

Another object of the invention is to provide a novel form of valve control means in a device of the above character, whereby an operator can deflate the tire without removing the device from the valve stem.

Further objects of the invention will appear from the following description in which the preferred embodiment of the invention has been set forth in detail in conjunction with the accompanying drawing. It will be understood that the appended claims are to be accorded a range of equivalents consistent with the state of the prior art.

Referring to the drawing:

Figure 1 is a plan view, illustrating a device incorporating the present invention.

Fig. 2 is a side elevational view, in cross section, illustrating the working parts of the device shown in Fig. 1.

Fig. 3 is a cross sectional detail taken along the line 3—3 of Fig. 2.

Fig. 4 is a cross sectional detail taken along line 4—4 of Fig. 2.

Fig. 5 is a cross sectional detail taken along line 5—5 of Fig. 2.

The device as illustrated in the drawing consists of a body 10 formed of suitable material, such as a casting of aluminum. Carried by the body 10, there is a suitable fitting 11, adapted to be connected to the end of a pneumatic hose. For applying the device to a tire stem of a tire to be inflated, I provide a suitable connector 12, which is attached to a fitting 13 by a short flexible hose section 14.

To afford novel pressure indicating means, body 10 is bored to form a cylinder 16, and slidably fitted within cylinder 16, there is a suitable pneumatic plunger or piston 17. Piston 17 is shown provided with a cup washer 18, to minimize leakage between the piston and the walls of cylinder 16. It will also be noted that piston 17 is relatively long, being provided with an extended sleeve 19. This sleeve carries a lug 21, which forms an indicating member. By reference to Fig. 1 it will be seen that indicating member 21 is accommodated in an elongated slot 22, and that it is associated with a graduated scale 23. The edge portion of scale 23 is releasably clamped to the body 10, by means of a frame 24, this construction affording an adjustment of the scale relative to the body 10 and relative to the indicating member 21. Scale 23 is preferably provided with one set of low pressure graduations 23a, and another set of high pressure graduations 23b.

Extending longitudinally of body 10, and axially of the cylinder 16, there is a guide member 26 which is preferably in the form of a tube. One end of tube 26 is provided with an enlarged annular portion 27, serving as a limiting stop for movement of piston 17 in one direction. One face of this enlargement is also sealed with respect to the body 10, as by means of an interposed gasket 28. That portion of tube 26 which extends beyond enlargement 27, is threaded for engagement with an internally threaded closure screw 31. The other end of tube 26 is provided with threaded engagement 32 with fitting 13. The passageway 33, in tube 26, is at its one end in free communication with hose 14 and connector 12, and at its other end in free communication with a port 34 formed in body 10. Piston 17 is also provided with an internal sleeve 36, in addition to the external sleeve 19, and this internal sleeve has a fairly snug sliding fit upon tube 26.

In Fig. 2 piston 17 has been shown in its retracted or zero position. In order to yieldingly urge the piston toward this position, I provide spring means which preferably utilizes two springs of different characteristics, which are arranged in series, so that one spring acts upon the other. Thus as shown in Fig. 2, I provide two springs 37 and 38, which are preferably of spring wire coiled helicoidally. Spring 37 is relatively stronger than spring 38, so that, for a given force upon spring 37 tending to compress it, the amount of compression will be substantially less than the amount of compression of spring 38 under the same force. One end of spring 37 is shown seated upon piston 17, and the remote end of spring 38 is shown seated upon fitting 13. The adjacent ends of springs 37 and 38 are shown seated upon an annular follower 39, which in turn is slidably retained upon tube 26. While the action of such a compound spring will be presently explained in greater detail, it may be pointed out that when piston 17 is moved toward a pressure indicating position, the weaker spring 38 is first compressed to a greater extent than the stronger spring 37. However after compression of spring 38 is no longer possible, further movement of piston 17 by higher pneumatic pressures is resisted by deflection of spring 37.

In the use of spring means such as explained above I have found that the corresponding high and low pressure graduations upon scale 23, cannot be equally spaced, if in the operation of the indicator the weaker spring is at times fully compressed. Likewise in practice inaccuracies are invariably encountered if full compression of the weaker spring is permitted. I therefore provide limiting means in conjunction with spring 38, to limit compression of this spring to an extent substantially less than full compression of the same. By full compression I have reference to such a degree of compression as will cause the convolutions of the springs to directly contact one upon the other. As a simple form of compression limiting means, I have shown a shoulder 41 formed upon tube 26. This shoulder is adapted to engage the end face or shoulder 42, formed upon the annular follower 39. Follower 39 is so proportioned, and shoulder 41 so positioned, that when shoulders 41 and 42 are in engagement, spring 38 is not fully compressed. Therefore for the full permitted range of operation of spring 38, its deflection will be substantially in direct proportion to compressional forces imposed upon the same.

The mounting of the springs 37 and 38 and arrangement of parts described above, enables an adjustment of the tension upon the spring means, without effecting a corresponding change in the zero adjustment of the indicating member 21. In this connection it will be noted that fitting 13 is ordinarily locked against rotation with respect to the body 10, by set screw 44. Upon loosening set screw 44, turning of fitting 13 serves to traverse the same like a nut upon the threaded end portion of tube 26, so that more or less initial tension is imposed upon springs 37 and 38.

In addition to the novel indicating means which has been previously described, I provide in conjunction with my device a manual operator 46, and valve means actuated by the operator 46, designated generally at 47. The particular form of operator 46 illustrated consists of a button shaped portion which can be readily engaged by the finger of the operator, and which is carried on one end of a stem 48. Stem 48 is slidably mounted within a bore 49, formed within the body 10. A lock pin 51, accommodated by a flattened portion 52 formed on stem 48, limits sliding movement, and prevents accidental removal. Extending from the inner end of stem 48, there is a pin 53, slidably fitted within a bore 54 formed axially of bore 49. A compression spring 55 serves to urge the stem 48 outwardly.

Valve means 47 is formed of two principal operating members, one being a primary valve member 56, and the other being a secondary valve member 57. Valve member 56 is provided with a cylindrical portion 58 slidable within a cylindrical bore 59, with a valve surface 61, and also with a pin 62 projecting into bore 54. Valve surface 61 is adapted to engage with a stationary valve seat 63. It will be noted that the cylindrical portion 58 is interrupted by a port 64, for a purpose to be presently explained. Bore 54 is in communication with the atmosphere thru a vent port 66, and bore 59 is in communication with the pneumatic chamber 67 behind piston 17, by means of a port 68.

The secondary valve member 57 cooperates with a stationary seat member 69. It is also urged toward closed position, by a compression spring 71. It will be noted that seat member 69 is so constructed, that the interior of bore 59 is always in communication with port 34. Likewise when the secondary valve member 57 is in open position, air pressure from the hose connected to fitting 11, is free to flow thru port 34, and thus thru passage 33 to connector 12 and to the tire being inflated.

In order to cooperate with the secondary valve member 57, the primary valve member 56 is also provided with an inwardly projecting pin 73, and a valve surface 74. When valve member 56 is moved to its limiting position toward the right as viewed in Fig. 2, pin 73 forces secondary valve member 57 to open position, and at the same time valve surface 74 seals upon the seating surface 76 provided on the seat member 69.

Operation of my device is as follows:—Assuming that the operator wishes to inflate a tire, the first operation is to apply the connector 12 to the valve stem, while the actuator 46 is in the position illustrated in Fig. 2. Air from the tire will immediately flow thru passage 33 to the pressure chamber 67 behind piston 17, by way of port 34, bore 59, and port 68. The pressure thus imposed upon piston 17, will force this piston against the pressure of springs 37 and 38, and the corresponding position of indicator 21 with respect to scale 23, will apprise the operator of the tire pressure. If the tire pressure is too low, the operator then forces actuator 46 inwardly to the limit of its movement, thus causing the primary valve member 56 to open the secondary valve member 57, thus permitting high pressure air from the hose connected to fitting 11, to flow thru port 34, and thru passage 33 to the tire. At the same time the seating of surface 74 of primary valve member 56, upon the stationary seating surface 76, will prevent application of high pressure air to the pressure chamber 67. In fact at this time pressure chamber 67 will be vented to the atmosphere, thru ports 66 and 68. While the tire is being inflated, the operator may at any time secure an indication of the tire pressure, merely by releasing all manual force upon the actuator 46. While a pressure indication is being taken, a small amount of air will be continuously bled thru the clearance between tube 26 and sleeve 36. In the event a greater pressure than desired is applied to the tire, the operator can vent the tire pressure to the atmosphere, merely by returning the actuator 46 to an intermediate position. In such position primary valve 56 will have its valve surface 61 disengaged from the seat 63, to permit a flow of air by way of port 34, bore 59, and port 66, to the atmosphere. Likewise during such an intermediate position, a false indication is not secured, because port 68 is substantially closed by the cylindrical portion 58 of the primary valve member 56.

Because of the novel spring means employed, my device can be manufactured with uniformly high accuracy, and this accuracy will be maintained for long periods of use. Accuracy in the indications secured is also due in part to the relatively small amount of friction between the piston and its cooperating parts, and between the follower 39 and tube 26. It will be noted that this follower is not in contact with the adjacent portion of body 10, and that it retains the intermediate portions of springs 37 and 38 out of contact with tube 26 and the body.

I claim:

1. In a pressure gauge to be used in the inflation of both low and high pressure tires, a pneumatic cylinder, a guide member extending longitudinally of and centrally of the cylinder, a piston slidably disposed within the cylinder and upon said guide member, means for establishing communication between the space at one side of the piston and the tire to be inflated, whereby pneumatic pressure on the piston tends to move the same in one direction, spring means serving to resiliently urge the piston in the opposite direction, said spring means comprising a pair of coiled compression springs connected in series whereby one spring acts upon the other, one spring being substantially weaker than the other, and a follower for retaining the adjacent ends of said springs with respect to said guide members.

2. In a pressure gauge to be used in the inflation of both low and high pressure tires, a cylinder, a guide member extending longitudinally of the cylinder and centrally of the cylinder, a piston slidably disposed within the cylinder and upon said guide member, means for establishing communication between the space at one side of the piston and the tire to be inflated, whereby pneumatic pressure on the piston will tend to move the same in one direction, an indicating member movable together with said piston, a low and high pressure graduated scale associated with said indicating member, spring means serving to resiliently urge the piston in a direction opposite to that in which the piston is urged by said pneumatic pressure, said spring means comprising a pair of coiled compression springs connected in series whereby one spring acts upon the other, one spring being substantially weaker than the other, and means for limiting compression of the weaker spring to an extent substantially less than the full compression of the same, said last means including a follower slidably mounted upon the guide member and serving to engage the adjacent ends of the spring.

3. In a pressure gauge to be used in the inflating of both low and high pressure tires, a body formed to provide a pneumatic cylinder, a guide tube mounted upon said body and extending longitudinally and centrally of the cylinder, one end of said tube being adapted to be placed in communication with a tire to be inflated, a piston slidably disposed within the cylinder and upon said guide tube, means for establishing communication between the space at one side of the piston and the other end of said guide tube, whereby pneumatic pressure on the piston tends to move the same in one direction, spring means serving to resiliently urge the piston in the opposite direction, said spring means comprising a pair of coiled compression springs connected in series whereby one spring acts upon the other, one spring being substantially weaker than the other, and a follower for retaining the adjacent ends of said spring with respect to said guide tube.

JULIUS H. BECKER.